US006980557B1

(12) United States Patent
Wahler

(10) Patent No.: US 6,980,557 B1
(45) Date of Patent: Dec. 27, 2005

(54) COMMUNICATIONS SYSTEM WITH COMMUNICATION TERMINALS WHICH ARE CONNECTED TO A SWITCHING SYSTEM VIA A PACKET-ORIENTED COMMUNICATION NETWORK

(75) Inventor: Josef Wahler, Taufkirchen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/831,014

(22) PCT Filed: Nov. 2, 1999

(86) PCT No.: PCT/DE99/03481

§ 371 (c)(1),
(2), (4) Date: May 3, 2001

(87) PCT Pub. No.: WO00/27163

PCT Pub. Date: May 11, 2000

(30) Foreign Application Priority Data

Dec. 6, 1999 (DE) ................................ 198 50 641

(51) Int. Cl.[7] .............................................. H04J 3/16
(52) U.S. Cl. .................... 370/395.61; 370/466
(58) Field of Search ............................... 370/465, 466, 370/467, 395.61

(56) References Cited

U.S. PATENT DOCUMENTS 5,894,477 A * 4/1999 Brueckheimer et al. .... 370/353
5,946,323 A * 8/1999 Eakins et al. ............... 370/468
5,949,756 A * 9/1999 Kienberger et al. ......... 370/232
6,014,378 A * 1/2000 Christie, deceased et al. ............ 370/356
6,021,134 A * 2/2000 Hiraiwa et al. ............. 370/474
6,195,346 B1 * 2/2001 Pierson, Jr. .................. 370/352
6,674,729 B1 * 1/2004 DuRee ....................... 370/286

FOREIGN PATENT DOCUMENTS

DE 196 04 244 8/1997

OTHER PUBLICATIONS

XP 000671919—Hybrid ATM/ISDN Subscriber Connection to a Broadband ISPBX—Schlichtharle, pp. 209-213.
XP 000495538—All Band Switching Node Architecture for Flexible and Cost-Effective Evolution Toward B-ISDN—Ohnishi et al., pp. 57-61.

* cited by examiner

Primary Examiner—Chau Nguyen
Assistant Examiner—Blanche Wong
(74) Attorney, Agent, or Firm—Bell Boyd & Lloyd LLC

(57) ABSTRACT

A switching system is connected to a communication network via a broadband access unit having a network access interface and communication terminals are connected to the communication network via hubs. The broadband access unit has conversion units allocated to the hubs, via which conversion units a bi-directional conversion between the data format of the packet-oriented communication network and a data format within the switching system is effected. Furthermore, the broadband access unit has a switching network module for combining the data to be transmitted from the conversion units to the associated hubs.

9 Claims, 4 Drawing Sheets

COMMUNICATIONS SYSTEM WITH COMMUNICATION TERMINALS WHICH ARE CONNECTED TO A SWITCHING SYSTEM VIA A PACKET-ORIENTED COMMUNICATION NETWORK

BACKGROUND OF THE INVENTION

1. Field of the Invention

The present invention relates, generally, to a communications system with communication terminals connected to a switching system via a packet-oriented communication network and, more particularly, to a communications system wherein a switching system is connected to a communication network via a broadband access unit which has a network access interface, and communication terminals are connected to the communication network via hubs.

2. Description of the Prior Art

Both from German Laid-Open Specification DE 196 04 244 A1, and from Schlichthärle D.: "Hybrid ATM/ISDN Subscriber Connection to a Broadband ISPBX", Internal Conference on Computer Communication —Proceedings of the Conference—Towards a New World in Computer Communication, 28 Sep. 1992, XP000671919, a communications system is known in which the communication terminals allocated to a switching system are connected to the switching system via an ATM-based communication network. In this arrangement, subscriber interfaces for connecting communication terminals are provided by a number of ATM transfer units—frequently called ATM hubs—which are connected to the ATM-based connection network. The switching system and the ATM hub in each case have an ATM access unit via which, on the one hand, a connection to the ATM-based communication network is implemented and, on the other hand, a bi-directional conversion between the internal data format of the switching system or hub and the data format of the ATM-based communication network is effected.

Modern ATM hubs usually have 64 subscriber interfaces for connecting communication terminals to an ATM-based communication network. In particular, ISDN (Integrated Services Digital Network) communication terminals are connected via $S_0$ interfaces, or digital communication terminals are connected via interfaces derived therefrom such as, for example, $U_{P0}$ interfaces, via an ATM hub to an ATM-based communication network. In general, a $U_{P0}$ or an $S_0$ interface includes, on the one hand, two user data channels which, as ISDN-oriented B channels have a transmission rate of in each case 64 kBit/s and, on the other hand, a signalling channel which, as ISDN-oriented D channel, has a transmission rate of 16 kBit/s.

The switching system and the ATM hubs are frequently connected to an ATM-based communication network via a so-called STM1 (Synchronous Transfer Mode) interface having a maximum transmission bit rate of 155 Mbit/s. An access module providing such an STM1 interface is used in communications systems from the company Siemens AG under the internal name "STMA access module". In the text which follows, this name is used for such access modules having an STM1 interface.

An STMA access module arranged in the switching system currently provides the capability to support 32 subscriber interfaces of an ATM hub connected to an ATM-based communication network; i.e., it is possible to carry out data transmission between the STMA access module and 32 different communication terminals connected to an ATM hub. This only corresponds to a maximum transmission bit rate of 8 Mbit/s via the STM1 interface provided by the STMA access module (having a maximum transmission bit rate of 155 Mbit/s).

Thus, two STMA access modules are necessary in the switching system for supporting all 64 subscriber interfaces of an ATM hub, which is connected via an ATM-based communication network, with the switching system. Since both the STMA access modules and the ATM access unit of an ATM hub only have one STM1 interface in each case, it is necessary to interpose an additional ATM switching module. The ATM switching module concentrates the data to be transmitted between the switching system and the ATM hub from the two STMA access modules onto the ATM access unit of the ATM hub or, respectively, splits these data from the ATM access unit onto the two STMA access modules.

Using an enhanced STMA access module which supports a total of 64 subscriber interfaces there is no need to interpose an additional switching module since an STMA access module expanded in this manner supports all 64 subscriber interfaces of an ATM hub and, thus, these can be connected directly to the enhanced STMA access module. Thus, although only one STM1 interface, provided by an enhanced STMA access module, of the switching system is now occupied for each ATM hub connected to the ATM-based communication network, still only a maximum transmission bit rate of 16 Mbit/s is achieved via the STM1 interface (which has a maximum transmission bit rate of 155 Mbit/s).

It is an object of the present invention, therefore to specify an arrangement by which, when a number of ATM hubs are connected to a packet-oriented communication network, a data transmission can take place between a switching system and the ATM hubs via a network access of the switching system utilizing the transmission bandwidth provided by the network access.

SUMMARY OF THE INVENTION

In connection with the present invention, and to provide a better understanding of the basic configuration of a switching system, is helpful first to discuss again in greater detail principles which are already known.

In this connection, FIG. 1, which shows a diagrammatic representation of the essential functional units of a switching system PBX, serves to obtain a quicker understanding of the relationships. The switching system PBX has a central controller CC which can be connected to access modules and a switching network SN. The access modules include, in particular, subscriber line modules SLM11 . . . SLM1$x$, SLM21 . . . SLM2$x$, SLMn1 . . . SLMn$x$ and so-called trunk modules TM11, TM21, TMn1.

The subscriber line modules SLM have subscriber interfaces for connecting communication terminals KE to the switching system PBX. First, for example, ISDN communication terminals can be connected via $S_0$ interfaces or digital communication terminals can be connected via interfaces derived therefrom, such as, for example, $U_{p0}$ interfaces, to the switching system PBX. Furthermore, it is possible to connect analogue communication terminals and facsimile terminals to the switching system PBX via analogue a/b interfaces.

The trunk modules TM11, TM21, TMn1 are used for connecting the switching system PBX to communication networks or for connecting to other switching systems. A connection to another switching system is carried out, for example, via so-called "PCM Highways" (Pulse Code Modulation), frequently also called primary multiplex access or $S_{2M}$ interface in the literature, which generally include, on the one hand, 30 user data channels which are designed as ISDN-oriented B channels with a transmission rate of 64 kBit/s and, on the other hand, a signalling channel which is designed as ISDN-oriented D channel with a transmission rate of 64 kBit/s. A data transmission via such a "PCM highway" thus results in a maximum transmission bit rate of 2 Mbit/s. A known trunk module TM11, TM21, TMn1 for connecting a switching system PBX to an ATM-based communication network is, e.g., the "STMA access module" by the Siemens company mentioned in the introduction to the description.

A number of peripheral modules—subscriber line modules SLM11 ... SLM1x, SLM21 ... SLM2x, SLMn1 ... SLMnx and trunk modules TM11, TM21, TMn1 can be functionally combined to form a line trunk unit LTU1, ... ,LTUn. Each line trunk unit LTU1, ... LTUn is associated with a line trunk unit controller LTUC1, ... ,LTUCn which are in each case connected to the switching network SN and the central controller CC via a so-called LTU link having a transmission bandwidth of 4×4 Mbit/s. The message exchange between the peripheral modules and the central controller CC takes place via a signalling channel which is called by the reference symbol HDLC (High Level Data Link Control) FIG. 1, in the known HDLC point-to-multipoint method.

The line trunk units LTU1, ... ,LTUn are also associated with a so-called signalling unit SU. This signalling unit SU supplies communication terminals KE connected to the switching system PBX with audible tones and possibly with announcements stored in the signalling unit SU.

The central controller CC handles, among other things, the switching-related processing occurring with a communication link between communication terminals KE such as, e.g., the setting-up and clearing-down of the communication link. The central controller CC essentially includes a central processor DP, a processor for controlling the signalling DCL, a clock generator PCG and a database DB.

An essential advantage of the system according to the present invention then consists in that a broadband access unit according to the invention for connecting the switching system to the packet-oriented communication network can be implemented in a simple manner in switching systems already existing, instead of a conventional line trunk unit, without having to make any changes in the central controller of the switching system.

An advantage of further embodiments of the present invention consists in, among other things, that due to the modular configuration of the broadband access unit, which can be equipped both with broadband access modules and with narrowband access modules, the broadband access unit can be adapted in a simple manner to the current demand for broadband or narrowband subscriber accesses or network accesses.

Thus, the broadband access unit can be operated as a separate broadband switching system if it is exclusively equipped with broadband access modules and both as a broadband switching system and, in co-operation with the other components of the switching system, as a narrowband switching system if it is additionally equipped with narrowband access modules.

Additional features and advantages of the present invention are described in, and will be apparent from, the following Detailed Description of the Preferred Embodiments and the Drawings.

DETAILED DESCRIPTION OF THE PREFERRED EMBODIMENTS

Figure 2:
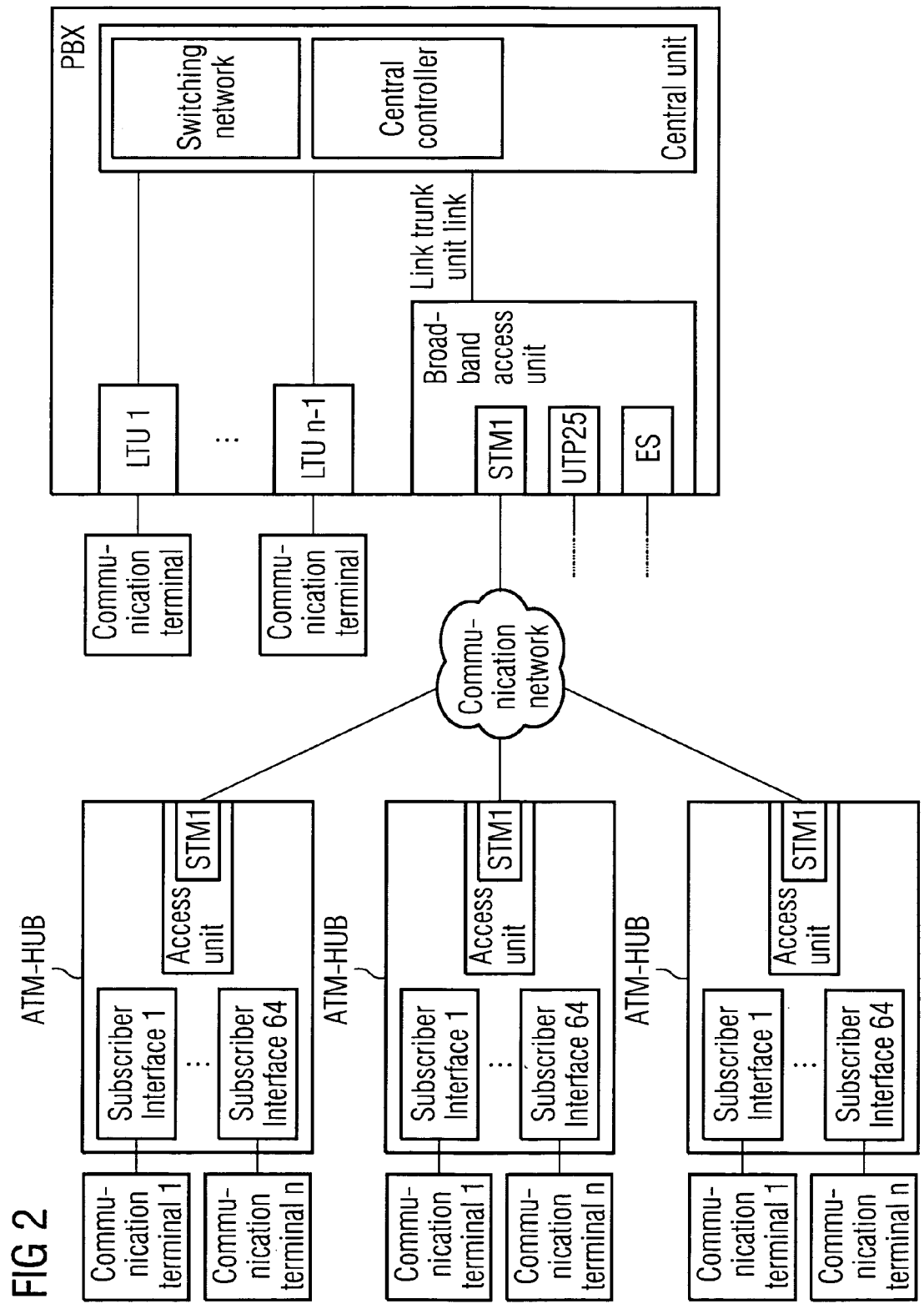
FIG. 2 shows a structural diagram for the diagrammatic representation of communication terminals connected to a switching system via a packet-oriented communication network.

FIG. 2 shows a diagrammatic representation of a switching system PBX with a broadband access unit BB-AE arranged instead of a conventional line trunk unit in the switching system PBX. The broadband access unit BB-AE is connected via at least one LTU (Line Trunk Unit) links LTU-VL with a central unit ZE, containing a switching network SN and a central controller CC, of the switching system PBX. A data transmission between the broadband access unit BB-AE and a central unit ZE via the LTU link LTU-VL is effected in accordance with a time-division multiplex-oriented data format and a data transmission with a maximum transmission bit rate of 4×4=16 Mbit/s is possible via an LTU link LTU-VL.

Figure 1:
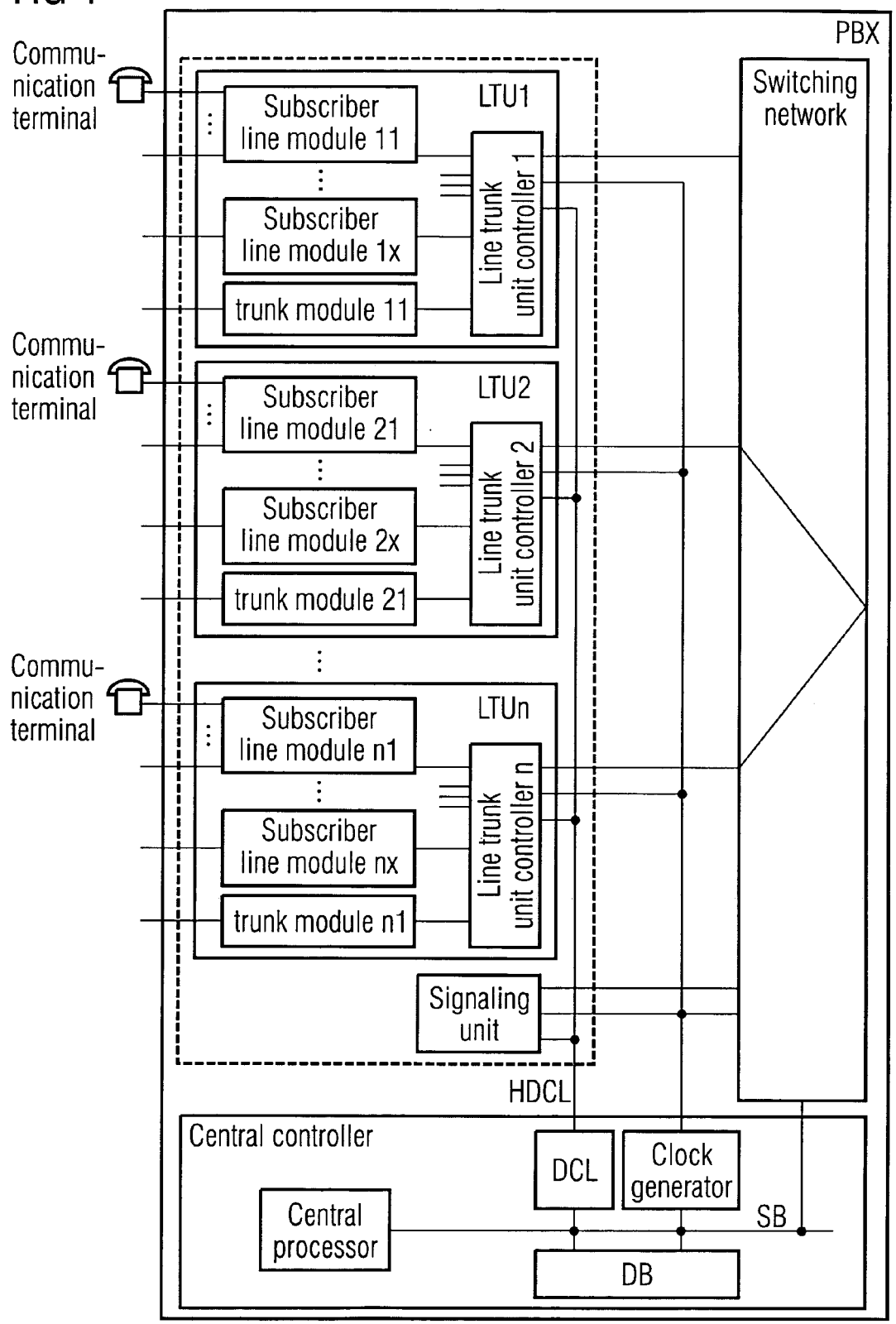
FIG. 1 shows a diagram of the functional units of a known switching system.

In addition, other line trunk units LTU1, ... ,LTUn−1, designed as described in connection with FIG. 1, are arranged in the switching system PBX, the line trunk units LTU1, ... , LTUn−1 being connected to the central unit ZE of the switching system PBX via, in each case, one LTU link LTU-VL. The line trunk units LTU1, ... , LTUn−1 connect communication terminals to the switching system PBX via subscriber interfaces or, respectively, implement a connection to a communication network or to another switching system. For example, communication terminals KE are connected to the link trunk units LTU1, ... LTUn−1. The broadband access unit BB-AE is connected via a so-called STM1 (Synchronous Transfer Mode) interface, having a maximum transmission bit rate of 155 Mbit/s, to an ATM-based (Asynchronous Transfer Mode) communication network ATM-KN. Furthermore, the broadband access unit BB-AE has other interfaces for connecting communication terminals or networks to the broadband access unit BB-AE. For example, a UTP25 interface (Unshielded Twisted Pair) having a maximum transmission bit rate of 25 Mbit/s and an Ethernet interface ES for connection to a computer network based on the IP (Internet Protocol) is shown.

Furthermore, so-called ATM transfer units ATM-HUB—frequently called "ATM hubs" in the literature—are connected to the ATM-based communication network ATM-KN. In this arrangement, the ATM hubs ATM-HUB are connected to the ATM-based communication network ATM-KN in each case via an access unit AE having an STM1 interface. The ATM hubs ATM-HUB additionally have subscriber interfaces TSS1, ... , TSS64 for connecting communication terminals to the ATM-oriented communication network ATM-KN. As an example, communication terminals KE ... , KEn are shown which are connected to the ATM hubs ATM-HUB via the subscriber interfaces TSS11, ... , TSS64. In particular, ISDN (Integrated Services Digital Network) communication terminals are connected via $S_0$ interfaces, or digital communication terminals are connected via interfaces derived therefrom, such as, for example, $U_{p0}$ interfaces, via the ATM hubs to the ATM-based communication network ATM-KN. In addition, there is the possibility of connecting analogue communication terminals to the ATM-oriented communication network ATM-KN via analogue a/b interfaces. Data transmission between communication terminals KE1, . . . , KEn and the switching system PBX is usually carried out on the basis of the time-division multiplex-oriented data format. For transmitting data between the communication terminals KE1, . . . , KEn and the switching system PBX via the ATM-based communication network ATM-KN, a bidirectional conversion is performed between the time-division multiplex-oriented data format and the data format of the ATM-oriented communication network ATM-KN by the access units AE of the ATM hubs ATM-HUB and the broadband access unit BB-AE.

Figure 3:
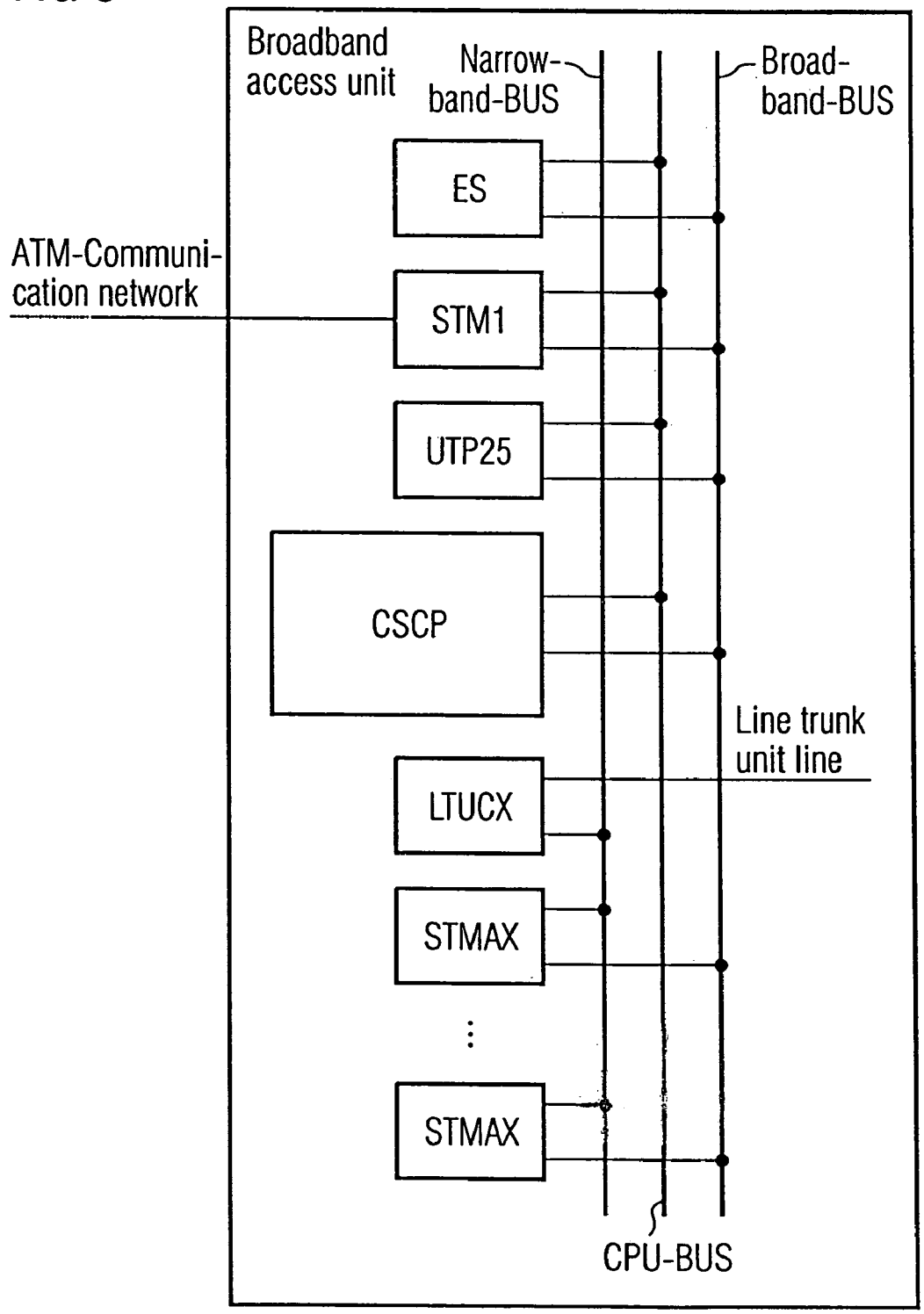
FIG. 3 shows a structural diagram for the diagrammatic representation of the essential functional units of a broadband access unit arranged in the switching system.

FIG. 3 shows a diagrammatic representation of the essential functional units of the broadband access unit BB-AE. The broadband access unit BB-AE has both a broadband bus system BB-BUS and a narrowband bus system NB-BUS for transmitting data within the access unit. In the broadband access unit BB-AE, a line trunk unit controller LTUCX is arranged which is connected both to the narrowband bus system NB-BUS and, via at least one LTU link LTU-VL, to the central unit ZE of the switching system PBX. The line trunk unit controller LTUCX performs a bi-directional conversion between the data format of the LTU link LTU-VL, an LTU link LTU-VL including four time-division multiplex-oriented 4-Mbit/s communication links, and the data format of the narrowband bus system NB-BUS which includes a number of time-division multiplex-oriented 2-Mbit/s communication links.

To convert the time-division multiplex-oriented data format in the access units—corresponding to the data format set up for data transmission via the narrowband bus system NB-BUS—to the data format of the ATM-based communication network ATM-KN, the broadband access unit BB-AE has conversion units STMAX. The conversion units STMAX are connected, on the one hand, via the narrowband bus system NB-BUS, in each case via eight time-division multiplex-oriented 2-Mbit/s data communication links, to the line trunk unit controller LTUCX and, on the other hand, via a UTOPIA (Universal Test and Operation PHY Interface for ATM) interface to the broadband bus system BB-BUS.

A bi-directional data transfer between the link trunk unit controller LTUCX and a conversion unit STMAX is possible with a maximum transmission bit rate of 16 Mbit/s via the eight time-division multiplex-oriented 2-Mbit/s communication links. With the present time-division multiplex-oriented data format, this corresponds to a number of 256 multiplex channels as a result of which a total of 64 subscriber interfaces can be supported by a conversion unit STMAX.

The broadband bus system BB-BUS is connected to broadband access modules for connecting communication terminals or computers, or for connecting the switching system PBX to a communication or computer network. As an example, an STM1 access module is shown via which, for example, the switching system PBX is connected to the ATM-based communication network ATM-KN. Furthermore, a UTP25 access module having a maximum transmission bit rate of 25 Mbit/s for connecting computers and an Ethernet interface ES for connecting the switching system PBX to a computer network based on the Internet protocol is shown. As an alternative, narrowband access modules also can be connected to the narrowband bus system NB-BUS instead of the broadband access modules STM1, UTP25, ES.

The access modules STM1, UTP25, ES are connected to a switching and control unit CSCP (Cell Switched Central Processor) via the broadband bus system BB-BUS and a CPU (Central Processing Unit) bus system CPU-BUS. Overall, a total of eight modules (ES, STM1, UTP25, CSCP, LTUCX, STMAX) can be connected to the broadband bus system BB-BUS and to the narrowband bus system NB-BUS of the broadband access unit BB-AE.

Figure 4:
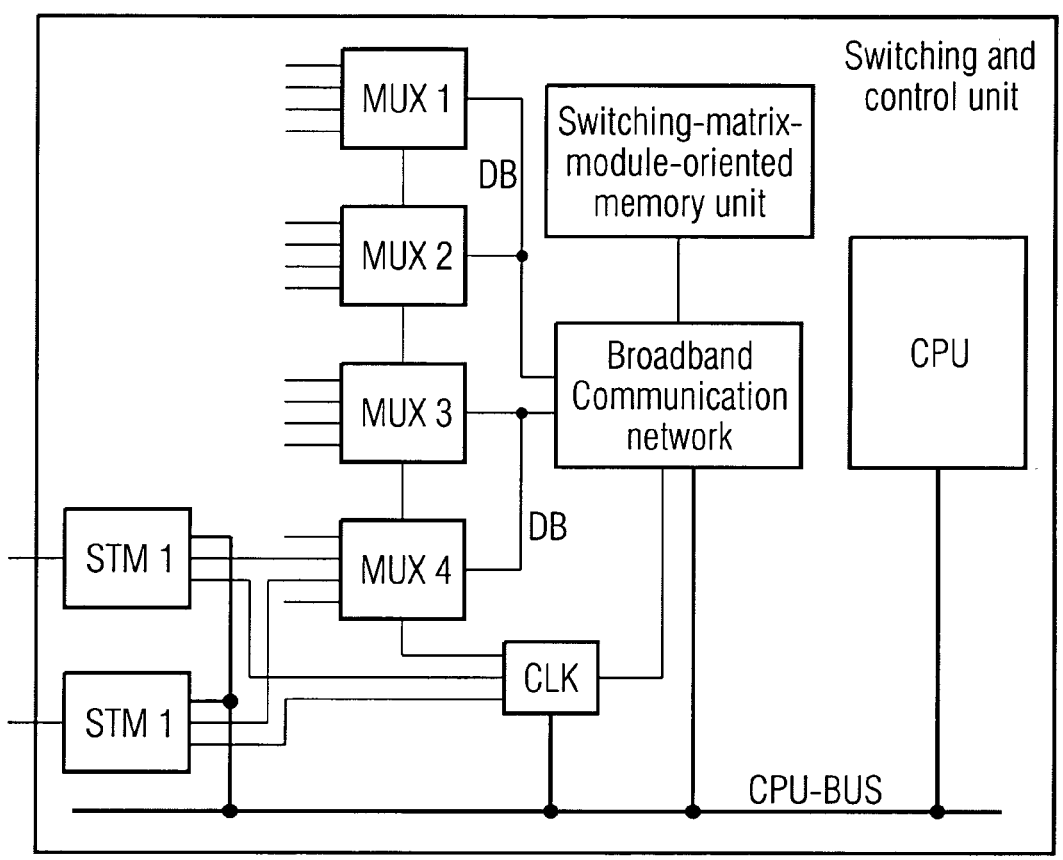
FIG. 4 shows a structural diagram for the diagrammatic representation of the essential functional units of a switching and control unit of the broadband access unit.

FIG. 4 shows a diagrammatic representation of the essential functional units of the switching and control unit CSCP. For cell-based data switching by the broadband access unit BB-AE, the switching and control unit CSCP essentially has a cell-based switching matrix module BB-KN and a control unit CPU. The switching and control unit CSCP also includes 4 multiplexers MUX1, . . . , MUX4 for connecting the cell-based switching matrix module BB-KN to the broadband bus system BB-BUS and other STM1 access units STM1 for connecting the switching and control unit CSCP directly to the ATM-based communication network ATM-KN or to another communication or computer network. For controlling a data transmission, the control unit CPU is connected to the cell-based switching matrix module BB-KN, to a clock generator CLK and the STM1 access units STM1 via the CPU bus system CPU-BUS. To provide the switching and control unit CSCP with a uniform clock supply, the clock generator CLK is connected to the multiplexers MUX1, . . . , MUX4, the cell-based switching matrix module BB-KN and the STM1 access units STM1.

The cell-based switching matrix module BB-KN has a switching-matrix-module-oriented memory unit SPE subdivided into two submemories. In the first submemory of the switching-matrix-module-oriented memory unit SPE, a switching table HTT—frequently called "Header Translation Table" in the literature—is stored. This header translation table HTT contains the necessary switching information stored in the form of a pair of values consisting of a so-called input VCI (Virtual Channel Identifier) value and a so-called output VCI value for switching ATM cells, via which information an ATM cell arriving at the cell-based switching matrix module BB-KN is switched. The second submemory of the switching-matrix-module-oriented memory unit SPE is used for temporarily storing the user data transmitted in a payload area of an ATM cell during the switching of the ATM cell in the cell-based switching matrix module BB-KN.

Furthermore, the cell-based switching matrix module BB-KN has two high-frequency UTOPIA interfaces. The cell-based switching matrix module BB-KN is connected via the UTOPIA interfaces to, in each case, two multiplexers MUX1, . . . , MUX4 via in each case one 16-bit-wide cell-based UTOPIA databus DB. A bi-directional data transmission rate of 622 Mbit/s can be achieved via the 16-bit-wide cell-based UTOPIA databus DB. The multiplexers MUX1, . . . , MUX4, which are designed, for example, as described in the German Patent application having the official reference 197 515 60.6, convert the data format of the 16-bit-wide cell-based UTOPIA databus DB to the data format of the 8-bit-wide broadband bus system BB-BUS. The multiplexers MUX 1, . . . , MUX4 can be connected in each case to a maximum of four 8-bit-wide databuses via which a maximum bidirectional data transmission rate of 310 Mbit/s can be achieved.

The multiplexers MUX1, . . . , MUX4 are, thus, connected to broadband access modules STM1, UTP25, ES or to conversion units STMAX either via the broadband bus system BB-BUS or directly to the STM1 access units (shown, for example, for the multiplexer MUX4 in FIG. 4) arranged in the switching and control unit CSCP via an 8-bit-wide UTOPIA databus.

In the text which follows, explanation is provided for the interaction of the functional units essential to data transmission between two communication terminals in greater detail with reference to FIGS. 1 and 2.

For data transmission starting from a first communication terminal KE connected to the ATM-based communication network ATM-KN via a subscriber interface TSS1, ..., TSS64 of an ATM hub ATM-HUB, to a second communication terminal KE connected via a subscriber interface of a line trunk unit LTU1, ..., LTUn−1 of the switching system PBX, the time-division multiplex-oriented data format usually provided for a data transmission between the first communication terminal KE and the second communication terminal KE is converted to the data format of the ATM-based communication network ATM-KN in the access unit AE of the ATM hub ATM-HUB associated with the first communication terminal KE. In this process, a bi-directional conversion between the time-division multiplex-oriented data format and the data format of the ATM-based communication network ATM-KN can be effected, for example, in accordance with the two conversion methods proposed in the German Patent application having the file reference 198 436 25.4.

The converted data transmitted via the ATM-based communication network ATM-KN and received by the STM1 access module STM1 of the broadband access unit BB-AE, via which the switching system PBX has been connected to the ATM-based communication network ATM-KN, are transmitted to a conversion unit STMAX allocated to the ATM hub ATM-HUB via the broadband bus system BB-BUS of the broadband access unit BB-AE. The conversion unit STMAX converts the received converted data back into the time-division multiplex-oriented data format in accordance with the conversion method used in the access unit AE of the ATM hub ATM-HUB allocated to the first communication terminal KE. The data to be transmitted is then transmitted via the narrowband bus system NB-BUS to the line trunk unit controller LTUCX which adapts the data to be transmitted for a transmission via the line trunk unit link LTU-VL (within the access unit, the data is transmitted via time-division multiplex-oriented 2-Mbit/s communication links; data is transmitted via the LTU link LTU-VL via time-division multiplex-oriented 4-Mbit/s communication links), and then forwards it to the central unit ZE of the switching system PBX via the LTU link LTU-VL. In the central unit ZE, the data to be transmitted is switched to the line trunk unit LTU1, ..., LTUn−1 allocated to the second communication terminal KE by the switching network SN of the switching system PBX, which line trunk unit forwards the data to the second communication terminal KE.

A data transmission starting from the second communication terminal KE to the first communication terminal KE analogously takes place in the reverse direction.

For a data transmission starting from the first communication terminal KE to a third communication terminal KE also connected to the ATM-based communication network ATM-KN via a subscriber interface TSS1, ..., TSS64 of an ATM hub ATM-HUB, the time-division multiplex-oriented data format usually provided for a data transmission between the first communication terminal KE and the third communication terminal KE is converted to the data format of the ATM-based communication network ATM-KN in the access unit AE of the ATM hub ATM-HUB allocated to the first communication terminal KE.

The converted data transmitted via the ATM-based communication network ATM-KN and received by the STM1 access module STM1 of the broadband access unit BB-AE are transmitted to the switching and control unit CSCP of the broadband access unit BB-AE via the broadband bus system BB-BUS of the broadband access unit BB-AE. In cases in which the switching and control unit CSCP is connected directly to the ATM-based communication network ATM-KN via an STM1 interface—compared to FIG. 4—the converted data to be transmitted can be transmitted directly to the switching and control unit CSCP from the ATM hub ATM-HUB allocated to the first communication terminal KE via the ATM-based communication network ATM-KN.

In the switching and control unit CSCP, the converted data to be transmitted is switched by the cell-based switching matrix module BB-KN and transmitted via the broadband bus system BB-BUS to the STM1 access module STM1 via which the converted data to be transmitted is forwarded to the ATM hub ATM-HUB allocated to the third communication terminal KE via the ATM-based communication network ATM-KN. As an alternative, the converted data to be transmitted can be transmitted directly to the relevant ATM hub ATM-HUB via the ATM-based communication network ATM-KN from the switching and control unit CSCP via the STM1 interfaces of the switching and control unit CSCP.

The access unit AE of the ATM hub ATM-HUB allocated to the third communication terminal KE converts the converted data to be transmitted back into the time-division multiplex-oriented data format in accordance with the conversion method used in the ATM hub ATM-HUB allocated to the first communication terminal and is forwarded to the third communication terminal KE.

A data transmission starting from the third communication terminal KE to the first communication terminal KE is effected analogously in the reverse direction.

Although the present invention has been described with reference to specific embodiments, those of skill in the art will recognize that changes may be made thereto without departing from the spirit and scope of the invention as set forth in the hereafter appended claims.

What is claimed is:

1. A communications system, comprising:
   a packet-oriented communication network;
   a plurality of communication terminals, connected to the packet-oriented communication network via a plurality of hubs; and
   a switching system connected to the packet-oriented communication network, the switching system including:
   a broadband access unit,
   a central unit,
   a plurality of conversion units and
   a switching matrix module,
   wherein the broadband access unit is connected to the central unit via a time-slot-oriented link and is further connected to the packet-oriented communication network via at least one packet-oriented network access interface,
   wherein the plurality of conversion units are allocated to the plurality of hubs via which a bidirectional conversion between a data format of the packet-oriented communication network and a time-slot-oriented data format is effected,
   and wherein the switching matrix module combines data to be transmitted to the plurality of hubs from the conversion units for transmission via the packet-oriented network access interface.

2. A communications system as claimed in claim 1, wherein the broadband access unit has both a broadband bus system for transmitting a packet-oriented data stream within the access unit and a narrowband bus system for transmitting a time-slot-oriented data stream within the access unit, and wherein the broadband bus system can be coupled to the narrowband bus system via the plurality of conversion units.

3. A communications system as claimed in claim 2, wherein the narrowband bus system is connected to a line trunk unit controller via which the broadband access unit can be connected to the central unit, which further includes a switching network and a central controller, via the time-slot-oriented link.

4. A communications system as claimed in claim 3, wherein the line trunk unit controller is connected to the central unit via at least one time-division multiplex-oriented 4-Mbit/s data communication link.

5. A communications system as claimed in claim 3, wherein a number of time-division multiplex-oriented 4 Mbit/s communication links can be determined by a number of the plurality of conversion units arranged in the broadband access unit.

6. A communications system as claimed in claim 2, wherein access units connected to the narrowband bus system are connected to one another via at least one time-division multiplex-oriented 2 Mbit/s communication links.

7. A communications system as claimed in claim 2, wherein both the broadband bus system and the narrowband bus system have access locations for a plurality of access units.

8. A communications system as claimed in claim 6, wherein at least one of the broadband access modules and the narrowband access modules can be connected to the access locations.

9. A communications system as claimed in claim 7, wherein the access units can be respectively connected to the broadband bus system via one 15 UTOPIA.

* * * * *